United States Patent
Li et al.

(10) Patent No.: US 12,333,822 B2
(45) Date of Patent: Jun. 17, 2025

(54) METHOD AND APPARATUS FOR VEHICLE POSITIONING

(71) Applicant: BEIJING XIAOMI MOBILE SOFTWARE CO., LTD., Beijing (CN)

(72) Inventors: Hao Li, Beijing (CN); Chi Zhang, Beijing (CN); Hao Liu, Beijing (CN); Kun Guo, Beijing (CN); Kuiyuan Yang, Beijing (CN); Rui Cai, Beijing (CN); Zhiwei Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 356 days.

(21) Appl. No.: 17/682,495

(22) Filed: Feb. 28, 2022

(65) Prior Publication Data

US 2023/0082656 A1    Mar. 16, 2023

(30) Foreign Application Priority Data

Sep. 14, 2021 (CN) .......................... 202111076719.X

(51) Int. Cl.
| | | |
|---|---|---|
| G06V 20/58 | (2022.01) | |
| B60W 40/105 | (2012.01) | |
| G06T 7/12 | (2017.01) | |
| G06T 7/90 | (2017.01) | |
| G06V 20/56 | (2022.01) | |

(52) U.S. Cl.
CPC ........... *G06V 20/58* (2022.01); *B60W 40/105* (2013.01); *G06T 7/12* (2017.01); *G06T 7/90* (2017.01); *G06V 20/588* (2022.01); *B60W 2420/403* (2013.01); *B60W 2552/53* (2020.02); *B60W 2554/4041* (2020.02)

(58) Field of Classification Search
CPC ... G06V 20/58; G06V 20/588; B60W 40/105; B60W 2420/403; B60W 2552/53; B60W 2554/4041; G06T 7/12; G06T 7/90; G06T 7/73; G06T 7/13; G06T 2207/20068; G06T 2207/30256; G01C 21/30; G01C 21/3602; G01D 21/02
See application file for complete search history.

(56) References Cited

U.S. PATENT DOCUMENTS

| | | | |
|---|---|---|---|
| 2019/0271549 A1* | 9/2019 | Zhang | G06T 7/70 |
| 2020/0302662 A1* | 9/2020 | Homayounfar | G06V 10/454 |
| 2022/0292711 A1* | 9/2022 | Pan | G06T 7/73 |

(Continued)

OTHER PUBLICATIONS

European Patent Application No. 22158835.3, Search and Opinion dated Sep. 2, 2022, 9 pages.

(Continued)

*Primary Examiner* — John Villecco
*Assistant Examiner* — Han Hoang
(74) *Attorney, Agent, or Firm* — Cozen O'Connor

(57) ABSTRACT

A method and an apparatus for vehicle positioning. The method includes: acquiring a distance transformation image of a road marking object in a road image based on the road image of an environment where a vehicle is located at a current time point; acquiring a vector subgraph of the road marking object from a global vector map; and determining a target positioning posture of the vehicle based on the distance transformation image and the vector subgraph.

13 Claims, 6 Drawing Sheets

(56) References Cited

U.S. PATENT DOCUMENTS

2022/0300745 A1* 9/2022 Yang .................. G06V 10/80

OTHER PUBLICATIONS

Pauls, J-H et al. "Monocular Localization in HD Maps by Combining Semantic Segmentation and Distance Transform"; 2020 IEEE/RSJ Int'l Conf on Intelligent Robots and Systems (IROS); Oct. 2020; pp. 4595-4601.

Kejie, Q. et al. "Compact 3D Map-Based Monocular Localization Using Semantic Edge Alignment"; arxiv.org, Cornell Univ. Library; Mar. 27, 2021; 7 pages.

* cited by examiner

METHOD AND APPARATUS FOR VEHICLE POSITIONING

CROSS REFERENCE TO RELATED APPLICATION

This application is based on and claims priority to Chinese patent application No. 202111076719X, filed on Sep. 14, 2021, the entire content of which is hereby incorporated into this application by reference.

TECHNICAL FIELD

The present disclosure relates to a field of automatic drive, and particularly to a method and an apparatus for vehicle positioning.

BACKGROUND

Vehicle positioning is generally performed through positioning layer or high-precision vector map. However, a method for vehicle positioning through positioning layer is not high in robustness due to influences of light and dynamic obstacles, and a method for vehicle positioning through high-precision vector map is relatively high in cost due to influences of hardware and system configurations.

SUMMARY

An embodiment of a first aspect of the present disclosure proposes a method for vehicle positioning. The method includes: acquiring a distance transformation image of a road marking object in a road image based on the road image of an environment where a vehicle is located at a current time point; acquiring a vector sub-graph of the road marking object from a global vector map; and determining a target positioning posture of the vehicle based on the distance transformation image and the vector subgraph.

An embodiment of a second aspect of the present disclosure proposes another apparatus for vehicle positioning. The apparatus includes: at least one processor; and a memory communicatively coupled to the at least one processor. The memory is stored with instructions executable by the at least one processor. When the instruction is performed by the at least one processor, the at least one processor is configured to: acquire a distance transformation image of a road marking object in a road image based on the road image of an environment where a vehicle is located at a current time point; acquire a vector sub-graph of the road marking object from a global vector map; and determine a target positioning posture of the vehicle based on the distance transformation image and the vector subgraph.

An embodiment of a third aspect of the present disclosure proposes a computer readable storage medium stored with computer instructions thereon. The computer instructions are configured to cause a computer to perform a method for vehicle positioning. The method includes: acquiring a distance transformation image of a road marking object in a road image based on the road image of an environment where a vehicle is located at a current time point; acquiring a vector sub-graph of the road marking object from a global vector map; and determining a target positioning posture of the vehicle based on the distance transformation image and the vector subgraph.

DETAILED DESCRIPTION

The embodiments of the present disclosure are described in detail below. Examples of the embodiments are shown in the accompanying drawings, in which the constant same or similar labels indicate the same or similar components or components with the same or similar functions. The embodiments described below with reference to the accompanying drawings are exemplary, and are intended to explain the disclosure, but should not be understood as a limitation to the disclosure.

A method and an apparatus for vehicle positioning in embodiments of the present disclosure are described in combination with the accompanying drawings below.

Figure 1:
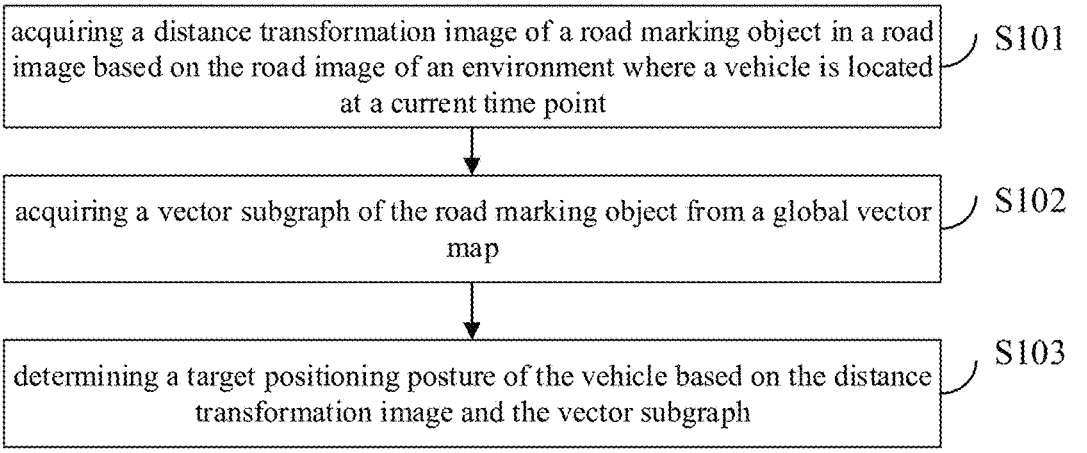
FIG. 1 is a flowchart illustrating a method for vehicle positioning in an embodiment of the present disclosure.

FIG. 1 is a flowchart illustrating a method for vehicle positioning in an embodiment of the present disclosure. As illustrated in FIG. 1, the method includes the following blocks.

At block S101, a distance transformation image of a road marking object in a road image is acquired based on the road image of an environment where a vehicle is located at a current time point.

In the embodiment of the disclosure, an apparatus for capturing an image is provided in front of the vehicle. The apparatus for capturing the image may capture a road image of a vehicle. Alternatively, the apparatus for capturing the image may be a camera. Alternatively, the apparatus for capturing the image may be provided on a rearview mirror of the vehicle, or may be provided on other positions, such as a central console, a roof of the vehicle.

In some implementations, image recognition is performed on the road image, to extract the road marking object from the road image. Or in some implementations, semantic segmentation is performed on the road image, to extract the road marking object from the road image. The semantic segmentation may classify pixels in the road image, so as to distinguish all pixels belonging to the road marking object in the road image. For example, the semantic segmentation may be performed on the road by a full convolutional network, to extract the road marking object from the road image. In other implementations, edge detection may be performed on the road image, for example, a contour in the road image is extracted by a Sobel operator or a Roberts operator, so as to extract the road marking object.

Alternatively, the road marking object may be one or more of a traffic sign, a lane line, and a traffic pole. In the embodiment of the disclosure, it may be described by taking the lane line and the traffic pole as an example.

Figure 2:
FIG. 2 is a diagram illustrating a road image in an embodiment of the present disclosure.
Figure 3:
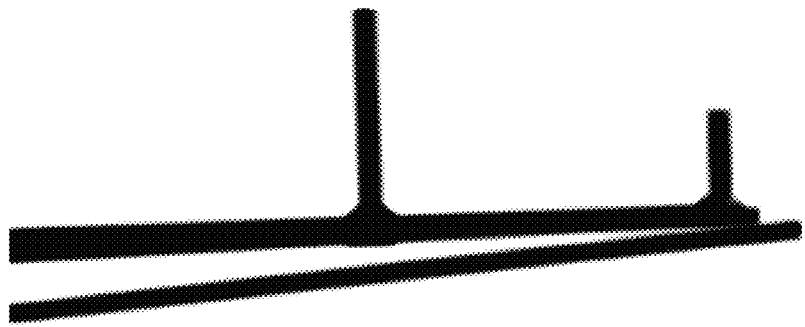
FIG. 3 is a diagram illustrating a distance transformation image in an embodiment of the present disclosure.

As illustrated in FIG. 2, after the lane line and the traffic pole in the road image are extracted, blurring processing is performed on the road image, and for any pixel in the road image, a gray value of any pixel in the road image represents a distance between the pixel and the road marking object, so as to acquire the distance transformation image of the road marking object as illustrated in FIG. 3. For example, the road image may be converted into a grayscale image via a weighting method, a mean method or a maximum value method, and further the gray value in the grayscale image is corrected through the distance between each pixel in the road image and the road marking image, so as to acquire the distance transformation image of the road marking object.

At block S102, a vector subgraph of the road marking object is acquired from a global vector map.

The global vector map includes a plurality of solid figures such as buildings, traffic signs, lane lines, traffic poles and the like, and has a relatively large of data volume. In some implementations, in order to reduce unnecessary calculation, screening for vector subgraphs may be performed on the global vector map to acquire a vector subgraph corresponding to the road marking object from the global vector map based on the road marking object, that is, to acquire a vector subgraph of the lane line and the traffic pole. Alternatively, in the embodiment of the disclosure, the global vector map is a prestored vector map of a province or a city where the vehicle is located.

At block S103, a target positioning posture of the vehicle is determined based on the distance transformation image and the vector subgraph.

Coordinate system conversion is performed on the vector subgraph, and the vector subgraph is backprojected to a 2D plane. The backprojected vector subgraph is matched with the distance transformation image, and the target positioning posture of the vehicle is determined based on a matching degree between the backprojected vector subgraph and the distance transformation image. Therefore, the method may avoid influences of light and obstacles on the vehicle positioning, and improve an accuracy of the vehicle positioning. For example, with evaluating the matching degree between the backprojected vector subgraph and the distance transformation image, a target constraint function is further determined, and with optimizing the positioning posture, when the matching degree between the backprojected vector subgraph and the distance transformation image is highest, that is, the target constraint function is minimum, the positioning posture may converge to a real positioning posture, that is, the target positioning posture of the vehicle is determined.

In the embodiment of the disclosure, the distance transformation image of the road marking object in the road image is acquired based on the road image of the environment where the vehicle is located at the current time point; the vector subgraph of the road marking object is acquired from the global vector map; and the target positioning posture of the vehicle is determined based on the distance transformation image and the vector subgraph. In the present disclosure, an additional positioning layer is avoided, and a positioning speed may be improved, a cost of the vehicle positioning may be reduced, the influences of the light and the obstacles on the vehicle positioning may be avoided, and the accuracy of the vehicle positioning may be improved.

Figure 4:
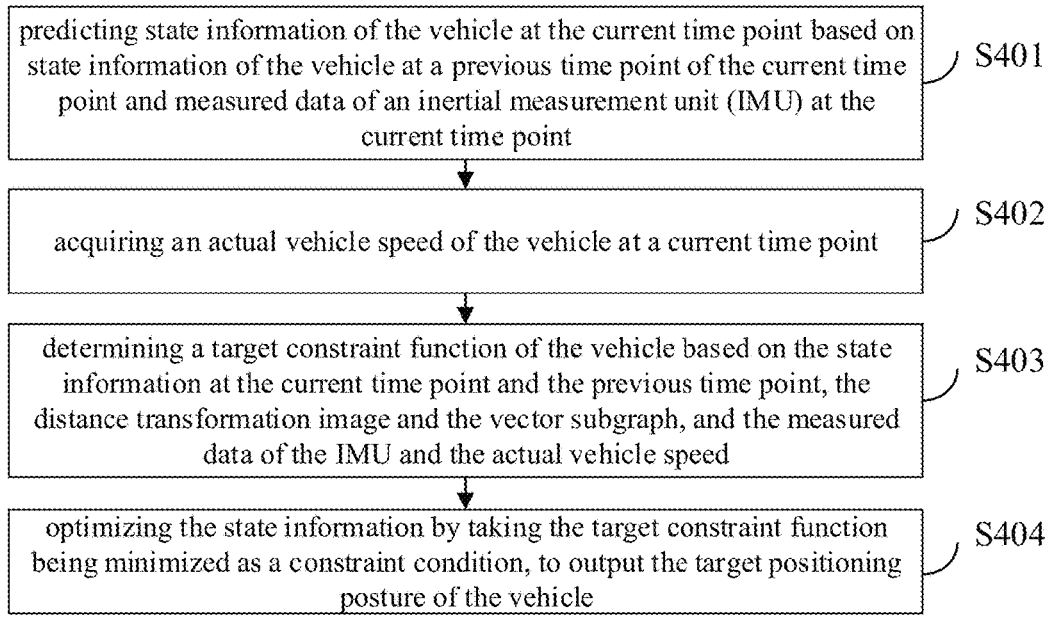
FIG. 4 is a flowchart illustrating a method for vehicle positioning in another embodiment of the present disclosure.

FIG. 4 is a flowchart illustrating a method for vehicle positioning in an embodiment of the present disclosure. As illustrated in FIG. 4, on the basis of the above embodiment, the method further includes the following blocks.

At block S401, state information of the vehicle at the current time point is predicted based on state information of the vehicle at a previous time point of the current time point and measured data of an inertial measurement unit (IMU) at the current time point.

In the embodiment of the disclosure, the inertial measurement unit (IMU) is provided on the vehicle to detect data of the vehicle, such as acceleration, angular velocity and gravity of the vehicle, and in combination with the state information of the vehicle at the previous time point, the state information of the vehicle at the current time point is predicted, that is, real-time state information of the vehicle is updated.

In the embodiment of the disclosure, the state information of the vehicle at the previous time point includes a positional posture and speed information of the vehicle at the previous time point.

Since the IMU has a high sampling frequency, and the data volume is very large, one piece of the measured data is usually extracted at regular intervals, for example, one piece of the measured data is extracted every 0.1 second interval. Recursive integration may be performed on measured data of the IMU between two adjacent time intervals At, and a recursion formula for integrating from an i-th time point to a j-th time point includes a plurality of measured data of the IMU. Alternatively, in order to reduce calculation amount, the state information of the vehicle at the current time point may be predicted by IMU pre-integration, and written into a form of the IMU pre-integration, so that the quantity of the pre-integration is not related to the quantity of the state at the i-th time point and the j-th time point. In this way, the quantity of the pre-integration may be not required to recalculate each time updating the quantity of the state at the i-th time point and the j-th time point. That is, the IMU pre-integration is performed on the measured data of the IMU, which may rapidly and accurately acquire the current positional posture, the speed and other information of the vehicle at the current time point.

At block S402, an actual vehicle speed of the vehicle at the current time point is acquired.

The actual vehicle speed of the vehicle at the current time point is acquired by an apparatus for detecting a speed. For example, the actual vehicle speed at the current time point may be detected by a vehicle speed sensor. For another example, a wheel speed sensor may be configured to measure a rotating speed of a vehicle wheel, further to the actual vehicle speed at the current time point is acquired based on the rotating speed of the vehicle wheel.

At block S403, a target constraint function of the vehicle is determined based on the state information at the current time point and the previous time point, the distance transformation image and the vector subgraph, and the measured data of the IMU and the actual vehicle speed.

The vector subgraph is mapped to the distance transformation image based on the state information at the current time point, that is, the vector subgraph is backprojected to the distance transformation image, so as to acquire a first image coordinate of a first pixel of the vector subgraph on the distance transformation image.

Further, the target constraint function is determined based on the first image coordinate, the state information at the current time point and the previous time point, the measured data of the IMU and the actual vehicle speed.

In some implementations, a gray value of each of the pixels is acquired from the distance transformation image based on the first image coordinate, and a first constraint parameter is generated based on the gray value. Alternatively, a sum value of gray values may be taken as the first constraint parameter, or an average value of the gray values may also be taken as the first constraint parameter.

In some implementations, the state information at the current time point is converted to a world coordinate system, and a second constraint parameter is generated based on the converted state information. Alternatively, a pitch angle and a roll angle of the vehicle, and a distance between the vehicle and a road surface where the vehicle is located may be acquired based on the converted state information, the pitch angle constrains an angle between the vehicle and the road surface, the roll angle constrains an angle at which the vehicle rolls over, and the distance between the vehicle and the road surface where the vehicle is located limits a vertical distance between a center point of the vehicle and a road plane. A sum value or a weighted value of the pitch angle of the vehicle, the roll angle of the vehicle, and the distance between the vehicle and the road surface where the vehicle is located is taken as the second constraint parameter. The world coordinate system is an absolute coordinate system in the present disclosure, and respective positions of coordinates of all points on an image before a vehicle body coordinate system is not established are determined based on an origin of the absolute coordinate system.

In some implementations, the measured vehicle speed in the measured data of the IMU is converted to a vehicle body coordinate system, and a third constraint parameter is generated based on the measured vehicle speed after conversion and the actual vehicle speed. Alternatively, a difference value between the measured vehicle speed after conversion and the actual vehicle speed may be configured as the third constraint parameter. The vehicle body coordinate system is a special dynamic coordinate system configured to describe a motion of the vehicle, where an origin of the vehicle body coordinate system coincides with a center of mass of the vehicle, and when the vehicle is in a stationary state on a horizontal road surface, a X-axis of the vehicle body coordinate system is parallel to the road surface and points to the front of the vehicle, a Z-axis of the vehicle body coordinate system points up through the center of mass of the vehicle, and a Y-axis of the vehicle body coordinate system points to a left side of a driver in the vehicle. In the present disclosure, the world coordinate system is converted to the vehicle body coordinate system, which may acquire a more accurate vehicle speed, and improve the accuracy of vehicle positioning.

In some implementations, the IMU pre-integration is performed on the measured data of the IMU between the previous time point and the current time point, to acquire a calculation increment of the IMU between adjacent time points, and a fourth constraint parameter is generated based on an actually measured increment of the IMU between the adjacent time points and the calculation increment of the IMU. Alternatively, the difference value between the actually measured increment of the IMU and the calculation increment of the IMU may be configured as the fourth constraint parameter.

The target constraint function of the vehicle is generated based on the first constraint parameter, the second constraint parameter, the third constraint parameter and the fourth constraint parameter. For example, a sum value of the first constraint parameter, the second constraint parameter, the third constraint parameter and the fourth constraint parameter may be taken as the target constraint function.

At block S404, the state information is optimized by taking the target constraint function being minimized as a constraint condition, to output the target positioning posture of the vehicle.

Alternatively, the target constraint function may be input into an optimizer, and the state information is iteratively updated by taking the target constraint function being minimized as the constraint condition. Thus, the state information is optimized, and the state information iterated when the target constraint function is minimized is determined as final state information at the current time point, further to the target positioning posture of the vehicle is acquired based on the optimized state information at the current time point.

In the embodiment of the disclosure, the state information of the vehicle at the current time point is predicted based on the state information of the vehicle at the previous time point and the measured data of the inertial measurement unit (IMU) at the current time point; and the actual vehicle speed of the vehicle at the current time point is acquired; and the target constraint function of the vehicle is determined based on the state information, the distance transformation image and the vector subgraph, and the measured data of the IMU and the actual vehicle speed; and the state information is optimized by taking the target constraint function being minimized as the constraint condition, to output the target positioning posture of the vehicle. In the present disclosure, an additional positioning layer is avoided, and a positioning speed may be improved, a cost of the vehicle positioning may be reduced, the influences of light and obstacles on the vehicle positioning may be avoided, and the accuracy of the vehicle positioning may be improved.

In some implementations, in order to improve the accuracy of vehicle positioning, when the target positioning posture of the vehicle is acquired, it is not only required constraint parameters at the current time point as reference, but also required to consider a plurality of historical time points that are adjacent to the current time point and continuous in time, that is, the plurality of historical time points that are adjacent to the current time point and continuous in time are acquired; and the target constraint function is generated based on a first constraint parameter, a second constraint parameter, a third constraint parameter and a fourth constraint parameter corresponding to each historical time point, and a first constraint parameter, a second constraint parameter, a third constraint parameter and a fourth constraint parameter corresponding to the current time point, and further the state information is optimized by taking the target constraint function being minimized as the constraint condition, to output the target positioning posture of the vehicle.

Figure 5:
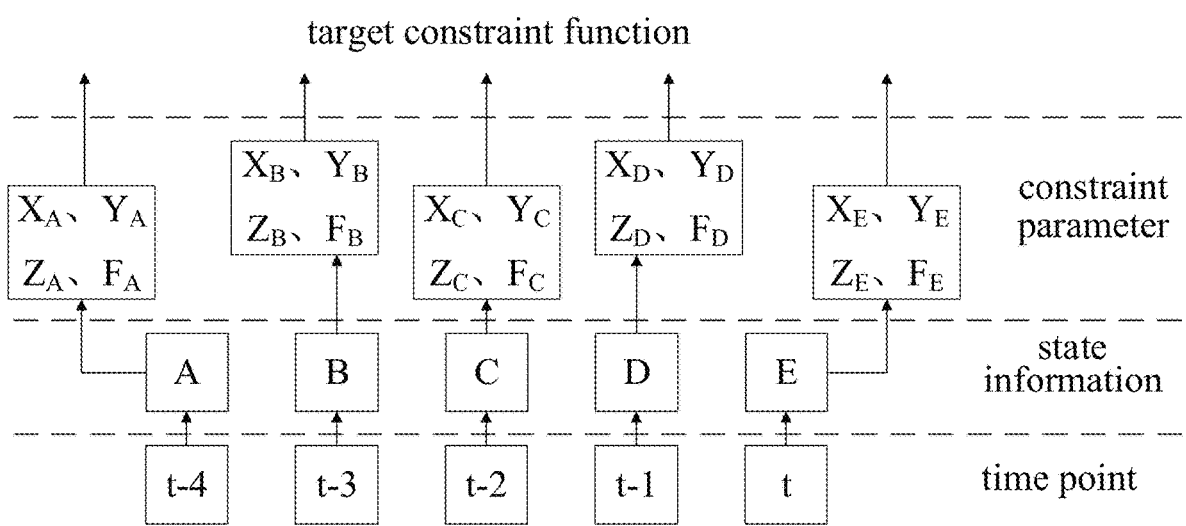
FIG. 5 is a flowchart illustrating a method for determining a target constraint function in another embodiment of the present disclosure.

As illustrated in FIG. 5, an example in the embodiments of the present application is described. When the current time point is a t time point, state information at a t-4 time point, a t-3 time point, a t-2 time point, a t-1 time point and the t time point are respectively acquired, the t-4 time point corresponds to state information A, the t-3 time point corresponds to state information B, the t-2 time point corresponds to state information C, the t-1 time point corresponds to state information D, and the t time point corresponds to state information E, and for each time point, a first constraint parameter, a second constraint parameter and a third constraint parameter at the corresponding time point are acquired based on the state information at the corresponding time point and a fourth constraint parameter is acquired based on the state information at the corresponding time point and the previous time point of the corresponding time point. For example, for the t-3 time point, a first constraint parameter $X_B$, a second constraint parameter $Y_B$ and a third constraint parameter $Z_B$ are acquired based on the state information B at the t-3 time point, and a fourth constraint parameter $F_B$ is acquired based on the state information B at the t-3 time point and the state information A at the t-4 time point. Further, the target constraint function is generated based on the constraint parameters at each time point, and the state information is optimized by taking the target constraint function being minimized as the constraint condition, so as to output the target positioning posture of the vehicle.

Figure 6:
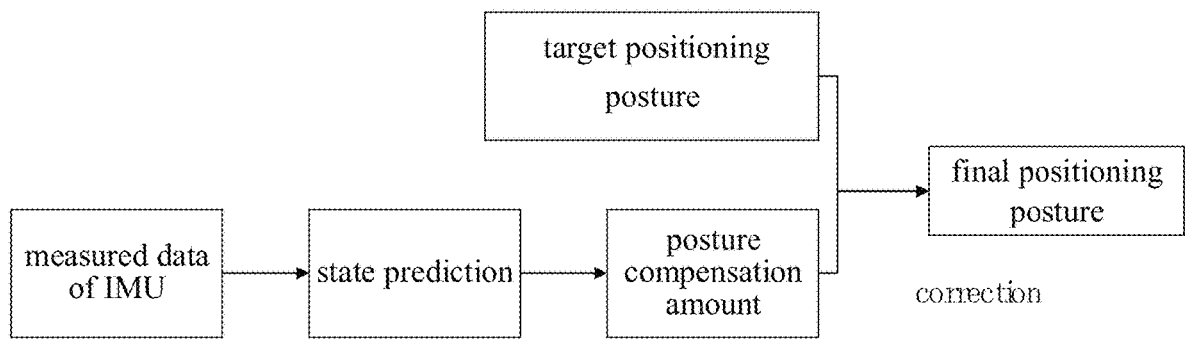
FIG. 6 is a flowchart illustrating a method for correcting a target positioning posture in another embodiment of the present disclosure.

In the implementation, when the blocks S101 and S102 are performed, certain time may be occupied so that a part of data in the state information has some lag. As illustrated in FIG. 6, in order to reduce errors and improve the precision of the vehicle positioning, in the embodiment of the disclosure, state is predicted based on the measured data of the IMU between the previous time point and the current time point to acquire a posture compensation amount, and further the target positioning posture is corrected based on the posture compensation amount, to obtain a final positioning posture of the vehicle.

In the present disclosure, an additional positioning layer is avoided, and a positioning speed may be improved, a cost of the vehicle positioning may be reduced, the influences of the light and the obstacles on the vehicle positioning may be avoided, and the accuracy of the vehicle positioning may be improved. The target positioning posture is corrected by the posture compensation amount, which may improve the accuracy of vehicle positioning.

Figure 7:
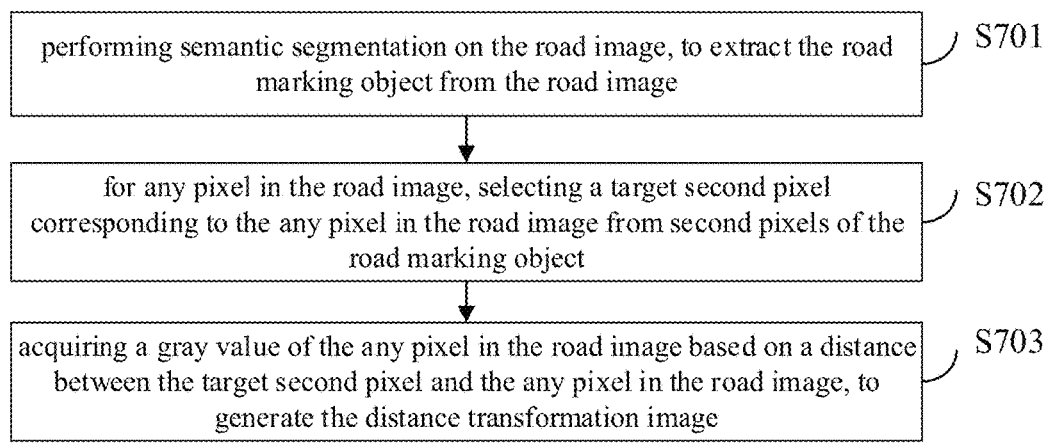
FIG. 7 is a flowchart illustrating a method for vehicle positioning in yet another embodiment of the present disclosure.

FIG. 7 is a flowchart illustrating a method for vehicle positioning in another embodiment of the present disclosure. As illustrated in FIG. 7, on the basis of the above embodiment, the method further includes the following blocks.

At block S701, semantic segmentation is performed on the road image, to extract a road marking object from the road image.

The descriptions of the block S701 may refer to the relevant contents of the above embodiments, which will not be repeated here.

At block S702, for any pixel in the road image, a target second pixel corresponding to the any pixel in the road image is selected from second pixels of the road marking object.

For each of the second pixels included in the road marking object, a distance between the any pixel in the road image and the corresponding second pixel is acquired based on a second image coordinate of the corresponding second pixel and an image coordinate of the any pixel in the road image.

A second pixel closest to the pixel in the road image is selected as the target second pixel based on the distance between the any pixel in the road image and each of the second pixels.

At block S703, a gray value of the any pixel in the road image is acquired based on a distance between the target second pixel and the any pixel in the road image, to generate the distance transformation image.

The gray value of the any pixel in the road image is acquired based on the distance between the target second pixel and the any pixel in the road image, that is, the smaller the distance between the target second pixel and the any pixel in the road image, the smaller the gray value of the any pixel in the road image, while the greater the distance between the target second pixel and the any pixel in the road image, the greater the gray value of the any pixel in the road image. In this way, the distance transformation image is generated. The distance transformation image in embodiments of the disclosure is a gray image.

In the present application, an additional positioning layer is avoided, and a positioning speed may be improved, a cost of the vehicle positioning may be reduced, the influences of the light and the obstacles on the vehicle positioning may be avoided, and the accuracy of the vehicle positioning may be improved.

Figure 8:
FIG. 8 is a diagram illustrating a road image in an embodiment of the present disclosure.
Figure 9:
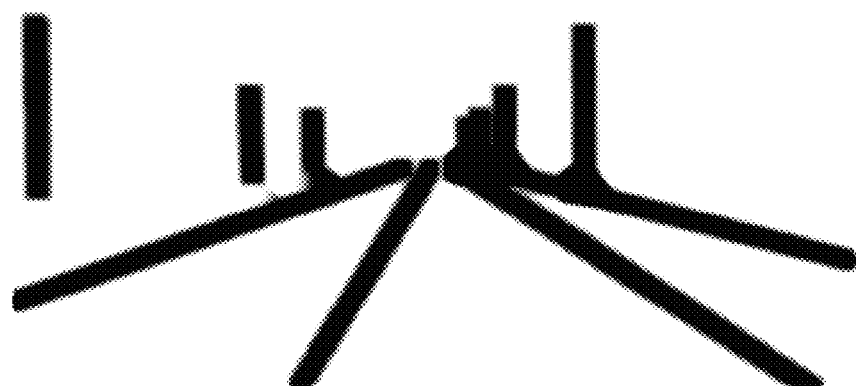
FIG. 9 is a diagram illustrating a distance transformation image in an embodiment of the present disclosure.

As illustrated in FIG. 8 and FIG. 9, in some implementations, acquiring the vector subgraph of the road marking object from the global vector map further includes: performing positioning on the global vector map based on a position of the vehicle, to acquire a candidate road section of the road where the vehicle is located; and extracting the vector subgraph of the road marking object in the candidate road section. In some implementations, a position of a next intersection is determined based on the position of the vehicle and the road where the vehicle is located, and a road section between the position of the vehicle and the position of the next intersection is taken as the candidate road section, and the vector subgraph of the road marking object in the candidate road section is extracted. In some implementations, a road section within a preset distance at a driving direction of the vehicle is determined based on the position of the vehicle and the road where the vehicle is located, and the road section within the preset distance is taken as the candidate road section, and the vector subgraph of the road marking object in the candidate road section is extracted.

In the embodiment of the disclosure, the positioning is performed on the global vector diagram based on the position of the vehicle, to acquire the candidate road section of the road where the vehicle is located, and the vector subgraph of the road marking object in the candidate road section is extracted. In the embodiment of the disclosure, the calculation amount is reduced, the speed of vehicle positioning is improved, and the accuracy of vehicle positioning is improved.

Figure 10:
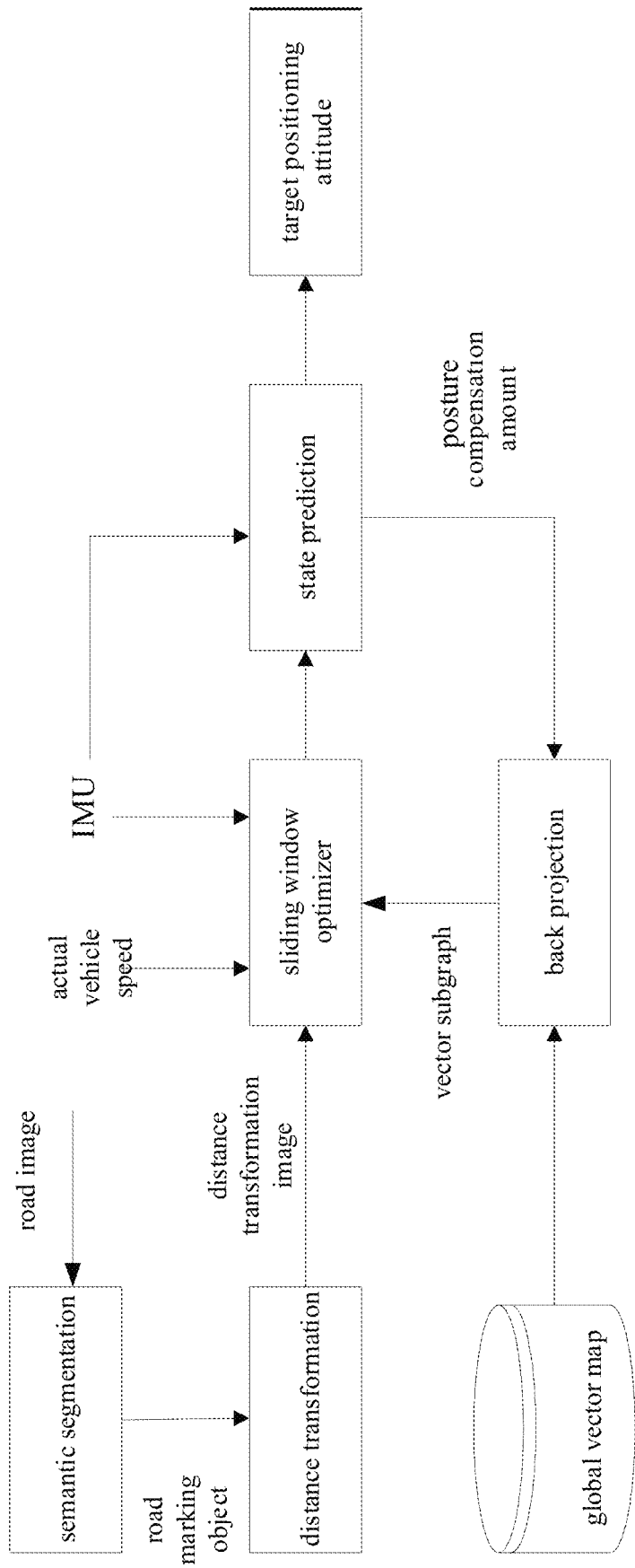
FIG. 10 is a flowchart illustrating a method for vehicle positioning in an embodiment of the present disclosure.

FIG. 10 is a flowchart illustrating a method for vehicle positioning in an embodiment of the present disclosure. As illustrated in FIG. 10, on the basis of the above embodiment, the method further includes the following.

The road image at the current time point is acquired, and the semantic segmentation is performed on the road image to acquire the road marking object, further the distance transformation image is acquired by means of distance transformation. The backprojection is performed on the global vector map to acquire the vector subgraph of the road marking object. Based on the actual vehicle speed of the vehicle and the measured data of the IMU at the current time point, the state information, the distance transformation image and the vector subgraph, the measured data of the IMU and the actual vehicle speed are input into a sliding window optimizer, to acquire prediction state information, and the prediction state information is optimized by the determined target function, and the state is predicted based on the measured data of the IMU between the previous time point and the current time point, and the prediction state information is corrected, and the target positioning posture of the vehicle is acquired.

In the present disclosure, an additional positioning layer is avoided, and a positioning speed may be improved, a cost of the vehicle positioning may be reduced, the influences of the light and the obstacles on the vehicle positioning may be avoided, and the accuracy of the vehicle positioning may be improved.

Figure 11:
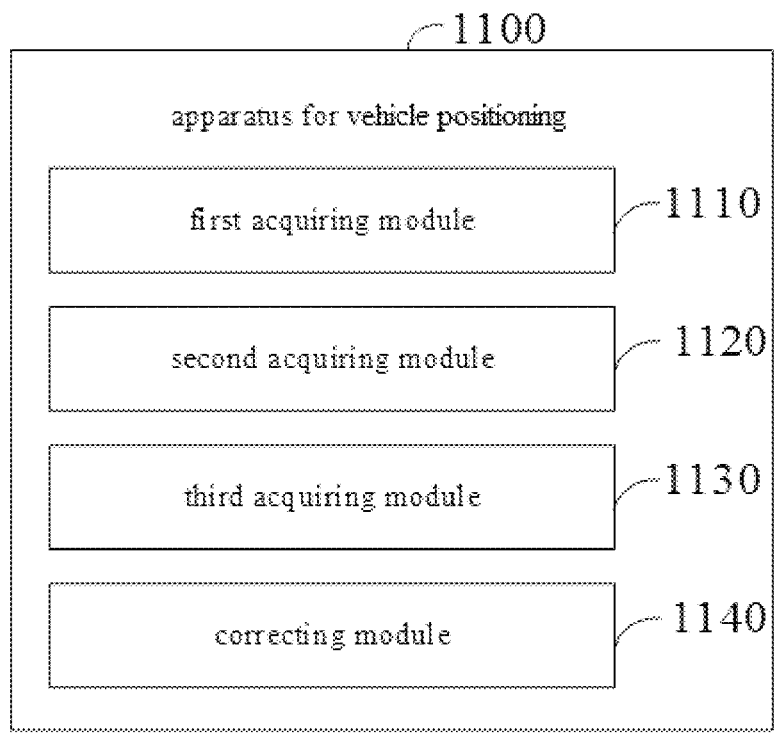
FIG. 11 is a block diagram illustrating a structure of an apparatus for vehicle positioning in an embodiment of the present disclosure.

FIG. 11 is a block diagram illustrating a structure of an apparatus for vehicle positioning in an embodiment of the present disclosure. As illustrated in FIG. 11, based on the same concept, an apparatus 1100 for vehicle positioning is further provided in the embodiments of the present disclosure, and includes: a first acquiring module 1110, a second acquiring module 1120, and a third acquiring module 1130.

The first acquiring module 1110 is configured to acquire and determine a distance transformation image of a road marking object in a road image based on the road image of an environment where a vehicle is located at a current time point. The second acquiring module 1120 is configured to acquire a vector subgraph of the road marking object from a global vector map. The third acquiring module 1130 is configured to determine a target positioning posture of the vehicle based on the distance transformation image and the vector subgraph.

Further, in a possible implementation in the embodiment of the present disclosure, the controlling module 1130 is further configured to: predict state information of the vehicle at the current time point based on state information of the vehicle at a previous time point of the current time point and measured data of an inertial measurement unit (IMU) at the current time point; acquire an actual vehicle speed of the vehicle at a current time point; determine a target constraint function of the vehicle based on the state information at the current time point and the previous time point, the distance transformation image and the vector subgraph, and the measured data of the IMU and the actual vehicle speed; and optimize the state information by taking the target constraint function being minimized as a constraint condition, to output the target positioning posture of the vehicle.

Further, in a possible implementation in the embodiments of the present disclosure, the controlling module 1130 is further configured to: map the vector subgraph to the distance transformation image based on the state information at the current time point, and acquire a first image coordinate of a first pixel of the vector subgraph on the distance transformation image; and determine the target constraint function based on the first image coordinate, the state information, the measured data of the IMU and the actual vehicle speed.

Further, in a possible implementation in the embodiment of the present disclosure, the controlling module 1130 is further configured to: acquire a gray value of each of the pixels from the distance transformation image based on the first image coordinate, and generate a first constraint parameter based on the gray value; convert the state information at the current time point to a world coordinate system, and generate a second constraint parameter based on the converted state information; convert the measured vehicle speed in the measured data of the IMU to a vehicle body coordinate system, and generate a third constraint parameter based on the measured vehicle speed after conversion and the actual vehicle speed; perform IMU pre-integration on the measured data of the IMU between the previous time point and the current time point, to acquire a calculation increment of the IMU between adjacent time points, and generate a fourth constraint parameter based on an actually measured increment of the IMU between the adjacent time points and the calculation increment of the IMU; and generate the target constraint function of the vehicle based on the first constraint parameter, the second constraint parameter, the third constraint parameter and the fourth constraint parameter.

Further, in a possible implementation in the embodiment of the present disclosure, the controlling module 1130 is further configured to: acquire a plurality of historical time points that are adjacent to the current time point and continuous in time; and generate the target constraint function based on a first constraint parameter, a second constraint parameter, a third constraint parameter and a fourth constraint parameter corresponding to each historical time point, and a first constraint parameter, a second constraint parameter, a third constraint parameter and a fourth constraint parameter corresponding to the current time point.

Further, in a possible implementation in the embodiment of the present disclosure, an apparatus for vehicle positioning further includes a correcting module 1140. The correcting module 1140 is further configured to: acquire a posture compensation amount based on the measured data of the IMU between the previous time point and the current time point; and correct the target positioning posture based on the posture compensation amount to obtain a final positioning posture of the vehicle.

Further, in a possible implementation in the embodiment of the present disclosure, the second acquiring module 1120 is further configured to: perform positioning on the global vector map based on a position of the vehicle, to acquire a candidate road section of the road where the vehicle is located; and extract the vector subgraph of the road marking object in the candidate road section.

Further, in a possible implementation in the embodiments of the present disclosure, the first acquiring module 1110 is further configured to: perform semantic segmentation on the road image, to extract the road marking object from the road image; for any pixel in the road image, select a target second pixel corresponding to the any pixel in the road image from second pixels of the road marking object; and acquire a gray value of the any pixel in the road image based on a distance between the target second pixel and the any pixel in the road image, to generate the distance transformation image.

Further, in a possible implementation in the embodiments of the present disclosure, the first acquiring module 1110 is further configured to: for each of the second pixels, acquire a distance between the any pixel in the road image and the second pixel based on a second image coordinate of the second pixel and an image coordinate of the any pixel in the road image; and select a second pixel closest to the any pixel in the road image as the target second pixel based on the distance between the any pixel in the road image and each of the second pixels.

In the present disclosure, an additional positioning layer may be avoided, and a positioning speed may be improved, and a cost of vehicle positioning may be reduced, and influences of light and obstacles on vehicle positioning may be avoided, and accuracy of vehicle positioning may be improved.

It should be noted that the foregoing explanation of the method for vehicle positioning is also applied to an apparatus for vehicle positioning in the embodiment, which will not be repeated here.

Based on the same concept, the embodiment of the present disclosure further provides an apparatus for vehicle positioning.

Figure 12:
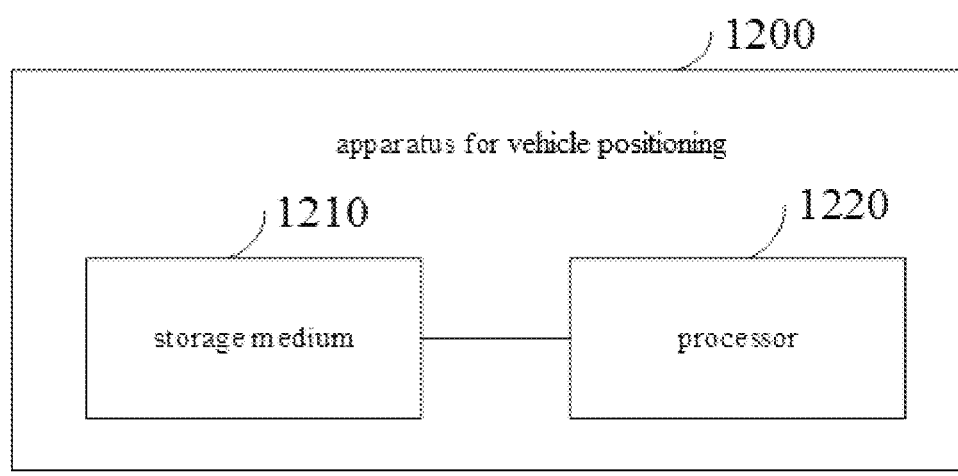
FIG. 12 is a block diagram illustrating a structure of an apparatus for vehicle positioning in an embodiment of the present disclosure.

FIG. 12 is a schematic diagram illustrating a structure of an apparatus for vehicle positioning in embodiments of the present disclosure. As illustrated in FIG. 12, the apparatus for vehicle positioning includes a storage medium 1210, a processor 1220 and a computer program product stored on the memory 1210 and running on the processor 1220. The processor achieves the method for vehicle positioning when performing a computer program.

Those skilled in the art should understand that the embodiment of the disclosure may provide a method, a system or a computer program product. Therefore, the present disclosure may adopt the forms of a complete hardware embodiment, a complete software embodiment and an embodiment in combination with a software and a hardware. Moreover, the present disclosure may adopt the form of implementing a computer program product on one or more computer available storage media (including but not limited to a magnetic disk memory, a CD-ROM, an optical memory, etc.) containing a computer available program code.

The present disclosure is described based on a flowchart and/or a block diagram of a method, a device (a system) and a computer program product in embodiments of the disclosure. It should be understood that each flow of the flowchart and/or the block diagram, and a combination of flows in the flowchart and/or the block diagram may be implemented by the computer programming instructions. The computer programming instructions may be provided to a general purpose computer, a special purpose computer, an embedded processor or processors of other programmable data processing devices to produce a machine, such that an apparatus configured to achieve one or more flows in the flowchart and/or the functions specified in one or more blocks in the block diagram is produced by the instructions performed by the processor of the computer or other programmable data processing device.

The computer programming instructions also may be stored in a computer readable memory capable of directing a computer or other programmable data processing device to function in a particular manner, such that the instructions stored in the computer readable memory produce a manufactured goods including an instruction apparatus configured to achieve one or more flows of the flowchart and/or the functions specified in one or more blocks in the block diagram.

The computer programming instructions may also be loaded on a computer or other programmable data processing device such that a series of operation blocks are performed on a computer or other programmable device to produce processing achieved by a computer, such that instructions performed on a computer or other programmable device provide one or more flows in the flowchart or blocks of the functions specified in one or more blocks in the block diagram.

Based on the same conception, a computer readable storage medium stored with computer instructions thereon is further provided in the embodiment of the disclosure, the computer instructions are configured to perform the method for vehicle positioning in the above embodiment by a computer.

Based on the same concept, a computer program product including a computer program is further provided in the embodiment of the present disclosure, the computer program is configured to perform the method for vehicle positioning as described in the above embodiment when performed by a processor.

It should be noted that in the claims, any reference symbols located between parentheses shall not be a limitation of the claims. The word "comprising" does not exclude the presence of components or blocks that are not listed in the claims. The words "a", "an" or "one" before the component do not exclude the presence of a plurality of such components. The disclosure may be achieved by means of a hardware including several different components and by means of a suitably programmed computer. In a unit claim listing several apparatuses, several of the apparatuses may be embodied by the same hardware item. "first", "second", "third" or similar words do not represent any sequence. The words are interpreted as designations.

In addition, the terms "first" and "second" used in the present disclosure are only for a description purpose, and may not be understood as relative importance of indication or implication or number of technical features indicated by implication. Therefore, features limiting "first" and "second" may explicitly or implicitly include one or more of the features. In the description of the disclosure, "a plurality of" means two or more than two, unless otherwise specified.

Although preferred embodiments of the present disclosure have been described, those skilled in the art may make additional changes and modifications to the embodiments once they learn the basic inventive concept. Therefore, the appended claims are intended to be construed as including preferred embodiments and all changes and modifications falling within the scope of the application.

Obviously, those skilled in the art may make various modifications and variations on the disclosure without departing from the spirit and scope of the disclosure. Thus, if modifications and variations of the present disclosure fall within the scope of the claims of the disclosure and their equivalent technologies, the disclosure is also intended to include these modifications and variations.

What is claimed is:

1. A method for vehicle positioning, comprising:
acquiring a distance transformation image of a road marking object in a road image based on the road image of an environment where a vehicle is located at a current time point;
acquiring a vector subgraph of the road marking object from a global vector map; and
determining a target positioning posture of the vehicle based on the distance transformation image and the vector subgraph;
wherein, determining the target positioning posture of the vehicle based on the distance transformation image and the vector subgraph, comprises:
predicting state information of the vehicle at the current time point based on state information of the vehicle at a previous time point of the current time point and measured data of an inertial measurement unit (IMU) at the current time point;
acquiring an actual vehicle speed of the vehicle at the current time point;
determining a target constraint function of the vehicle based on the state information at the current time point and the previous time point, the distance transformation image and the vector subgraph, and the measured data of the IMU and the actual vehicle speed; and
optimizing the state information by taking the target constraint function being minimized as a constraint condition, to output the target positioning posture of the vehicle;
wherein determining the target constraint function of the vehicle based on the state information, the distance transformation image and the vector subgraph, and the measured data of the IMU and the actual vehicle speed comprises:
mapping the vector subgraph to the distance transformation image based on the state information at the current time point, and acquiring a first image coordinate of a first pixel of the vector subgraph on the distance transformation image; and determining the target constraint function based on the first image coordinate, the state information, the measured data of the IMU and the actual vehicle speed;

wherein determining the target constraint function of the vehicle based on the first image coordinate, the state information, and the measured data of the IMU and the actual vehicle speed comprises:

acquiring a gray value of each of the pixels from the distance transformation image based on the first image coordinate, and generating a first constraint parameter based on the gray value;

converting the state information at the current time point to a world coordinate system, and generating a second constraint parameter based on the converted state information;

converting the measured vehicle speed in the measured data of the IMU to a vehicle body coordinate system, and generating a third constraint parameter based on the measured vehicle speed after conversion and the actual vehicle speed;

performing IMU pre-integration on the measured data of the IMU between the previous time point and the current time point, to acquire a calculation increment of the IMU between adjacent time points, and generating a fourth constraint parameter based on an actually measured increment of the IMU between the adjacent time points and the calculation increment of the IMU; and generating the target constraint function of the vehicle based on the first constraint parameter, the second constraint parameter, the third constraint parameter and the fourth constraint parameter.

2. The method of claim 1, wherein generating the target constraint function of the vehicle based on the first constraint parameter, the second constraint parameter, the third constraint parameter and the fourth constraint parameter comprises:

acquiring a plurality of historical time points that are adjacent to the current time point and continuous in time; and generating the target constraint function based on the first constraint parameter, the second constraint parameter, the third constraint parameter and the fourth constraint parameter corresponding to each historical time point, and the first constraint parameter, the second constraint parameter, the third constraint parameter and the fourth constraint parameter corresponding to the current time point.

3. The method of claim 1, after determining the target positioning posture of the vehicle, further comprising:

acquiring a posture compensation amount based on measured data of an inertial measurement unit (IMU) between a previous time point and a current time point; and correcting the target positioning posture based on the posture compensation amount to obtain a final positioning posture of the vehicle.

4. The method of claim 1, wherein acquiring the vector subgraph of the road marking object from the global vector map comprises:

performing positioning on the global vector map based on a position of the vehicle, to acquire a candidate road section of the road where the vehicle is located; and extracting the vector subgraph of the road marking object in the candidate road section.

5. The method of claim 1, wherein acquiring the distance transformation image of the road marking object in the road image, comprises:

performing semantic segmentation on the road image, to extract the road marking object from the road image;

for any pixel in the road image, selecting a target second pixel corresponding to the any pixel in the road image from second pixels of the road marking object; and acquiring a gray value of the any pixel in the road image based on a distance between the target second pixel and the any pixel in the road image, to generate the distance transformation image.

6. The method of claim 5, wherein selecting the target second pixel corresponding to the any pixel in the road image from the second pixels of the road marking object comprises:

for each of the second pixels, acquiring a distance between the any pixel in the road image and the second pixel based on a second image coordinate of the second pixel and an image coordinate of the any pixel in the road image; and selecting a second pixel closest to the any pixel in the road image as the target second pixel based on the distance between the any pixel in the road image and each of the second pixels.

7. An apparatus for vehicle positioning, comprising:

at least one processor; and a memory communicatively coupled to the at least one processor; wherein, the memory is stored with instructions executable by the at least one processor, when the instructions are performed by the at least one processor, the at least one processor is configured to:

acquire a distance transformation image of a road marking object in a road image based on the road image of an environment where a vehicle is located at a current time point;

acquire a vector subgraph of the road marking object from a global vector map; and determine a target positioning posture of the vehicle based on the distance transformation image and the vector subgraph;

wherein the at least one processor is configured to:

predict state information of the vehicle at the current time point based on state information of the vehicle at a previous time point of the current time point and measured data of an inertial measurement unit (IMU) at the current time point;

acquire an actual vehicle speed of the vehicle at the current time point;

determine a target constraint function of the vehicle based on the state information at the current time point and the previous time point, the distance transformation image and the vector subgraph, and the measured data of the IMU and the actual vehicle speed; and optimize the state information by taking the target constraint function being minimized as a constraint condition, to output the target positioning posture of the vehicle;

wherein the at least one processor is configured to:

map the vector subgraph to the distance transformation image based on the state information at the current time point, and acquire a first image coordinate of a first pixel of the vector subgraph on the distance transformation image; and determine the target constraint function based on the first image coordinate, the state information, the measured data of the IMU and the actual vehicle speed;

wherein the at least one processor is configured to:

acquire a gray value of each of the pixels from the distance transformation image based on the first image coordinate, and generate a first constraint parameter based on the gray value;

convert the state information at the current time point to a world coordinate system, and generate a second constraint parameter based on the converted state information;

convert the measured vehicle speed in the measured data of the IMU to a vehicle body coordinate system, and generate a third constraint parameter based on the measured vehicle speed after conversion and the actual vehicle speed;

perform IMU pre-integration on the measured data of the IMU between the previous time point and the current time point, to acquire a calculation increment of the IMU between adjacent time points, and generate a fourth constraint parameter based on an actually measured increment of the IMU between the adjacent time points and the calculation increment of the IMU; and generate the target constraint function of the vehicle based on the first constraint parameter, the second constraint parameter, the third constraint parameter and the fourth constraint parameter.

8. The apparatus of claim 7, wherein the at least one processor is configured to:

acquire a plurality of historical time points that are adjacent to the current time point and continuous in time; and generate the target constraint function based on the first constraint parameter, the second constraint parameter, the third constraint parameter and the fourth constraint parameter corresponding to each historical time point, and the first constraint parameter, the second constraint parameter, the third constraint parameter and the fourth constraint parameter corresponding to the current time point.

9. The apparatus of claim 7, wherein the at least one processor is configured to:

acquire a posture compensation amount based on measured data of an inertial measurement unit (IMU) between a previous time point and a current time point; and correct the target positioning posture based on the posture compensation amount to obtain a final positioning posture of the vehicle.

10. The apparatus of claim 7, wherein the at least one processor is configured to:

perform positioning on the global vector map based on a position of the vehicle, to acquire a candidate road section of the road where the vehicle is located; and extract the vector subgraph of the road marking object in the candidate road section.

11. The apparatus of claim 7, wherein the at least one processor is configured to:

perform semantic segmentation on the road image, to extract the road marking object from the road image;

for any pixel in the road image, select a target second pixel corresponding to the any pixel in the road image from second pixels of the road marking object; and acquire a gray value of the any pixel in the road image based on a distance between the target second pixel and the any pixel in the road image, to generate the distance transformation image.

12. The apparatus of claim 11, wherein the at least one processor is configured to:

for each of the second pixels, acquire a distance between the any pixel in the road image and the second pixel based on a second image coordinate of the second pixel and an image coordinate of the any pixel in the road image; and select a second pixel closest to the any pixel in the road image as the target second pixel based on the distance between the any pixel in the road image and each of the second pixels.

13. A non-transitory computer readable storage medium stored with computer instructions, wherein, the computer instructions are configured to cause a computer to perform a method for vehicle positioning, and the method comprises:

acquiring a distance transformation image of a road marking object in a road image based on the road image of an environment where a vehicle is located at a current time point;

acquiring a vector subgraph of the road marking object from a global vector map; and determining a target positioning posture of the vehicle based on the distance transformation image and the vector subgraph;

wherein determining the target positioning posture of the vehicle based on the distance transformation image and the vector subgraph, comprises:

predicting state information of the vehicle at the current time point based on state information of the vehicle at a previous time point of the current time point and measured data of an inertial measurement unit (IMU) at the current time point;

acquiring an actual vehicle speed of the vehicle at the current time point;

determining a target constraint function of the vehicle based on the state information at the current time point and the previous time point, the distance transformation image and the vector subgraph, and the measured data of the IMU and the actual vehicle speed; and optimizing the state information by taking the target constraint function being minimized as a constraint condition, to output the target positioning posture of the vehicle;

wherein determining the target constraint function of the vehicle based on the state information, the distance transformation image and the vector subgraph, and the measured data of the IMU and the actual vehicle speed comprises:

mapping the vector subgraph to the distance transformation image based on the state information at the current time point, and acquiring a first image coordinate of a first pixel of the vector subgraph on the distance transformation image; and determining the target constraint function based on the first image coordinate, the state information, the measured data of the IMU and the actual vehicle speed;

wherein determining the target constraint function of the vehicle based on the first image coordinate, the state information, and the measured data of the IMU and the actual vehicle speed comprises:

acquiring a gray value of each of the pixels from the distance transformation image based on the first image coordinate, and generating a first constraint parameter based on the gray value;

converting the state information at the current time point to a world coordinate system, and generating a second constraint parameter based on the converted state information;

converting the measured vehicle speed in the measured data of the IMU to a vehicle body coordinate system, and generating a third constraint parameter based on the measured vehicle speed after conversion and the actual vehicle speed;

performing IMU pre-integration on the measured data of the IMU between the previous time point and the current time point, to acquire a calculation increment of the IMU between adjacent time points, and generating a fourth constraint parameter based on an actually measured increment of the IMU between the adjacent time points and the calculation increment of the IMU; and generating the target constraint function of the vehicle based on the first constraint parameter, the second constraint parameter, the third constraint parameter and the fourth constraint parameter.

* * * * *